(12) United States Patent
Ostrovsky et al.

(10) Patent No.: US 8,386,661 B2
(45) Date of Patent: Feb. 26, 2013

(54) COMMUNICATION NETWORK FOR CONTROLLING DEVICES

(75) Inventors: Michael Ostrovsky, Brooklyn, NY (US); Alfred J. Lombardi, Syosset, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 757 days.

(21) Appl. No.: 11/559,676

(22) Filed: Nov. 14, 2006

(65) Prior Publication Data

US 2007/0162536 A1  Jul. 12, 2007

Related U.S. Application Data

(60) Provisional application No. 60/738,110, filed on Nov. 18, 2005.

(51) Int. Cl.
   *G06F 3/00* (2006.01)
   *G06F 15/177* (2006.01)
   *G06F 15/173* (2006.01)

(52) U.S. Cl. .............. 710/15; 710/18; 710/29; 709/220; 709/223; 709/229; 709/250; 700/9; 700/12; 700/275; 370/328; 340/539.1; 340/870.03

(58) Field of Classification Search .................... 710/15
   See application file for complete search history.

(56) References Cited

U.S. PATENT DOCUMENTS

| | | |
|---|---|---|
| 4,138,684 A | 2/1979 | Kerr |
| 4,334,171 A | 6/1982 | Parman et al. |
| 4,924,151 A | 5/1990 | D'Aleo et al. |
| 4,939,792 A | 7/1990 | Urbich et al. |
| 5,038,081 A | 8/1991 | Maile, Jr. et al. |
| 5,059,871 A | 10/1991 | Pearlman et al. |
| 5,079,559 A | 1/1992 | Umetsu et al. |
| 5,101,141 A | 3/1992 | Warner et al. |
| 5,191,265 A | 3/1993 | D'Aleo et al. |
| 5,225,765 A | 7/1993 | Callahan et al. |
| 5,239,205 A | 8/1993 | Hoffman et al. |
| 5,248,919 A | 9/1993 | Hanna et al. |
| 5,319,301 A | 6/1994 | Callaghan et al. |
| 5,400,041 A | 3/1995 | Strickland |
| 5,430,356 A | 7/1995 | Ference et al. |
| 5,448,230 A * | 9/1995 | Schanker et al. ........ 340/870.03 |
| 5,506,961 A * | 4/1996 | Carlson et al. .................... 726/5 |
| 5,510,679 A | 4/1996 | Maiale, Jr. et al. |
| 5,530,322 A | 6/1996 | Ference et al. |
| 5,678,062 A * | 10/1997 | Okada et al. .................... 710/22 |

(Continued)

FOREIGN PATENT DOCUMENTS

| | | |
|---|---|---|
| CN | 1481119 A | 3/2004 |
| WO | WO 03085856 A1 * | 10/2003 |

OTHER PUBLICATIONS

Rich Black, "Lutron Technology: Reliable. First. Forward Thinking.", Brochure, Aug. 2006, Lutron Electronics Co., Inc., Coopersburg, Pennsylvania, USA.

(Continued)

*Primary Examiner* — Idriss N Alrobaye
*Assistant Examiner* — Henry Yu
(74) *Attorney, Agent, or Firm* — Leviton Manufacturing Co. Inc.

(57) ABSTRACT

A system and method for controlling devices that are part of a peer to peer network of controllers is provided. Messages are routed to controllers of the network and such messages are used to control devices coupled to said controllers. Status messages indicating the state of devices are routed to controllers to allow the state of the devices to be displayed by said controllers.

32 Claims, 3 Drawing Sheets

U.S. PATENT DOCUMENTS

| | | | |
|---|---|---|---|
| 5,736,965 | A | 4/1998 | Mosebrook et al. |
| 5,838,226 | A * | 11/1998 | Houggy et al. ............ 340/12.32 |
| 5,867,127 | A | 2/1999 | Black et al. |
| 5,905,442 | A | 5/1999 | Mosebrook et al. |
| 5,982,103 | A | 11/1999 | Mosebrook et al. |
| 6,046,550 | A | 4/2000 | Ference et al. |
| 6,091,205 | A | 7/2000 | Newman, Jr. et al. |
| 6,192,401 | B1 * | 2/2001 | Modiri et al. ................. 709/220 |
| 6,211,626 | B1 | 4/2001 | Lys et al. |
| 6,211,796 | B1 * | 4/2001 | Toms et al. ..................... 340/8.1 |
| 6,297,724 | B1 | 10/2001 | Bryans et al. |
| 6,340,868 | B1 | 1/2002 | Lys et al. |
| 6,347,028 | B1 | 2/2002 | Hausman, Jr. et al. |
| 6,369,524 | B1 | 4/2002 | Sid |
| 6,380,692 | B1 | 4/2002 | Newman, Jr. et al. |
| 6,418,324 | B1 * | 7/2002 | Doviak et al. ............. 455/426.1 |
| 6,459,919 | B1 | 10/2002 | Lys et al. |
| 6,469,457 | B2 | 10/2002 | Callaghan |
| 6,507,158 | B1 | 1/2003 | Wang |
| 6,528,957 | B1 | 3/2003 | Luchaco |
| 6,684,253 | B1 * | 1/2004 | Whitaker et al. ............. 709/229 |
| 6,756,998 | B1 | 6/2004 | Bilger |
| 6,761,470 | B2 | 7/2004 | Sid |
| 6,792,472 | B1 * | 9/2004 | Otterness et al. ............. 709/239 |
| 6,795,472 | B2 * | 9/2004 | Akulova et al. .............. 372/50.1 |
| 6,798,341 | B1 | 9/2004 | Eckel et al. |
| 6,845,410 | B1 * | 1/2005 | Brown et al. .................... 710/29 |
| 6,901,439 | B1 * | 5/2005 | Bonasia et al. ............... 709/220 |
| 6,909,921 | B1 | 6/2005 | Bilger |
| 6,917,167 | B2 | 7/2005 | Courtney et al. |
| 6,993,417 | B2 | 1/2006 | Osann, Jr. |
| 7,027,416 | B1 * | 4/2006 | Kriz .............................. 370/328 |
| 7,038,910 | B1 | 5/2006 | Hodge et al. |
| 7,053,770 | B2 * | 5/2006 | Ratiu et al. ................. 340/539.1 |
| 7,071,634 | B2 | 7/2006 | Johnson et al. |
| 7,106,261 | B2 | 9/2006 | Nagel et al. |
| 7,164,238 | B2 | 1/2007 | Kazanov et al. |
| 7,166,970 | B2 | 1/2007 | Johnson et al. |
| 7,219,141 | B2 | 5/2007 | Bonasia et al. |
| 7,272,741 | B2 * | 9/2007 | Wilcox et al. ................. 713/503 |
| 7,302,498 | B2 * | 11/2007 | Tanaka ......................... 709/250 |
| 7,415,310 | B2 * | 8/2008 | Bovee et al. ...................... 700/9 |
| 7,477,920 | B2 * | 1/2009 | Scheinert et al. ............. 455/561 |
| 7,586,950 | B1 * | 9/2009 | Damle et al. ................. 370/474 |
| 7,600,047 | B2 * | 10/2009 | Tanaka ......................... 709/250 |
| 7,865,568 | B1 * | 1/2011 | Redi ............................. 709/217 |
| 8,073,925 | B2 * | 12/2011 | Wheeler et al. .............. 709/217 |
| 2001/0015862 | A1 | 8/2001 | Lynam et al. |
| 2002/0072868 | A1 * | 6/2002 | Bartone et al. ................. 702/62 |
| 2002/0152298 | A1 * | 10/2002 | Kikta et al. ................... 709/223 |
| 2003/0076281 | A1 | 4/2003 | Morgan et al. |
| 2003/0233129 | A1 | 12/2003 | Matos |
| 2004/0002792 | A1 | 1/2004 | Hoffknecht |
| 2004/0212324 | A1 | 10/2004 | Callaghan |
| 2005/0007249 | A1 * | 1/2005 | Eryurek et al. ............... 340/511 |
| 2005/0043907 | A1 | 2/2005 | Eckel et al. |
| 2005/0125083 | A1 | 6/2005 | Kiko |
| 2005/0225496 | A1 | 10/2005 | Apostolos et al. |
| 2005/0232184 | A1 * | 10/2005 | Borella ......................... 370/328 |
| 2005/0248300 | A1 | 11/2005 | Walko, Jr. et al. |
| 2005/0280598 | A1 | 12/2005 | Webb et al. |
| 2006/0049935 | A1 | 3/2006 | Giannopoulos et al. |
| 2006/0168191 | A1 * | 7/2006 | Ives ............................. 709/224 |
| 2006/0279236 | A1 | 12/2006 | Johnson et al. |
| 2007/0162536 | A1 | 7/2007 | Ostrovsky et al. |

OTHER PUBLICATIONS

International Search Report for International Application No. PCT/US2006/061064 dated Mar. 21, 2008 (2 pgs.).

* cited by examiner

COMMUNICATION NETWORK FOR CONTROLLING DEVICES

This application claims the benefit of the filing date of a provisional application having Ser. No. 60/738,110 which was filed on Nov. 18, 2005.

BACKGROUND OF THE INVENTION

1. Field of the Invention

The present invention relates to a communication network for controlling devices in accordance with a communication protocol

2. Description of the Related Art

Communication networks for controlling devices such as lights or lighting fixtures, fans and other appliances or systems in residential or commercial settings have been developed. In general, the devices are electrical loads. These networks are part of remote control systems that permit a user to remotely control, for example, the state (e.g., ON, OFF, Intensity, ... dim, bright, scene) of devices such as a light or a group of lights using handheld or wall mounted controllers. In some conventional remote control systems, wall mounted devices are adapted to receive signals from handheld controllers or wall mounted remote controllers. A controller is able to receive information about the status of a device being remotely controlled and the controller can display the status of such a device to a user even when the device is out of the user's view. Many conventional systems are implemented as wireless systems and some of these systems transmit and receive information using RF (Radio Frequency) signals.

An RF wireless system typically includes a Master controller for controlling dimmers/switches and the Master controller receives status information which it can display. In such a system, the Master controller broadcasts commands, such as status request commands, to the dimmers or switches. The dimmers or switches are examples of controllers that control devices such as light fixtures or fans. In response to the status request command from the Master controller, the controllers that control the devices broadcast the status of the controlled devices. The Master controller can then display the status of the devices based on the information broadcast by the controllers. The controllers that control the devices, as well as the Master controller, each represent a node of a network where each of these nodes is one or more components that can control one or more devices. Depending on the relative positioning of the different nodes with respect to each other and with respect to the Master controller, a message broadcast by the Master controller can be received by one or more or all of the nodes of the system. When a node cannot directly receive transmissions from the Master controller, the system uses repeaters so that all the nodes, if necessary, of the system are able to receive the Master controller's transmissions. The transmissions by the nodes (including the Master Controller) and the repeaters are, in essence, broadcasts that can be received by any node in the system. Because transmissions from the Master controller and transmissions from the controllers, with the help of repeaters, can be received anywhere in the system, a controller transmitting the status of a connected device doesn't have to specifically address any particular device or Master controller. Likewise, a Master controller transmitting its commands doesn't have to specifically address such commands to a particular controller in the system. Furthermore, because the messages are broadcast, the manner in which the messages are delivered to the node is not a consideration in such systems.

In many cases, a user may often want to know the status of a controlled device and more importantly a user may want to know whether the status of the device has been changed as a result of the manual operation of the device. Further, the status of the device may have changed as a result of a command sent from the Master Controller. That is, the controller controlling the device can change the status of the device due to a command from the Master controller or an actuation of the device or an actuation of the controller itself. Some systems are designed so that the controllers transmit the status of the device automatically upon the manual actuation of such a device or upon receiving a status request command from the Master controller. The status information transmitted by a controller of a device upon being manually actuated or upon receiving a command is known as 'true status'. A main disadvantage with a 'true status' system is that transmission of much of the status information in many instances is not necessary and often leads to an inefficient system. For example, when the intensity of a light is being decreased from one level to its final desired level, the intensity actuator (e.g., intensity button or rocker switch) is depressed several times until the desired level is reached. In a 'true status' system, the controller controlling the light (i.e., the dimmer/switch), transmits each intermediate intensity level; that is, each time the intensity button is depressed, the current light level is transmitted. Such a system is inefficient not only because of the transmissions of the intermediate light levels draining energy from the system, but also because of the transmission of information that is superfluous and of little value. In such a scenario, the final intensity level of the light may be the only information that needs to be transmitted because that is the information which the system needs to know.

Another example is when a dimmer is fading from a current intensity level to OFF. While fading between discrete intensity levels, each such level is transmitted causing not only power usage problems as discussed above, but efficiency problems in terms of bandwidth and delay. In such systems, the transmission of the status is either delayed until the final value of the fade intensity is reached or the different intensity levels are transmitted during the fade. Either technique can lead to adverse conditions for the system. For example, when the transmission of the status information is delayed, other commands to be transmitted by the Master controller will also be delayed until the entire response from the fading device is received and there will also be a delay in when the status is displayed by the Master controller.

The delay is especially problematic in the case where controllers or devices have toggle action actuators. If a user mistakenly activates a button with toggle action, the user cannot reverse the action until the fading finishes and the final "true" status value has been received. Since fading time may vary in very wide limits from a few seconds to tens of minutes, this may create a long time during which the system can't be controlled. If the 'true status' approach is not used and the status is provided after a status request command is sent, the Master controller has to keep polling the dimmer for a relatively long period of time and may not know the length of the fading time and thus when to stop the polling leading to an inefficient system.

Also, it is quite common for a lighting system to have the need to control not a single device, but a group of devices. For example there may be a need to turn ON or OFF all lights in a room or an entire house, or to create a scene using a group of lights where the lights in the group are set at various intensity levels. In such a case one controller may be changing the state of a group of lights (via messages to controllers such as dimmers and switches) and other controllers may also be controlling the same group of lights and update their display appropriately. When the 'true status' approach is used the lights start to send back (via their connected controllers) their status reports as soon as the status gets changed. Since in case of the group operation many devices change their status at about the same time, a bottleneck of status information may develop resulting in the loss of information. Also, while a controller is transmitting the 'true status' of a connected device, the status may have changed because the controller has received another command from a local controller and thus the status information it is currently transmitting to the Master controller is inaccurate. In systems with limited bandwidth, the relatively large amount of information needed to be transmitted during certain time periods may overwhelm the system because the system is incapable of transmitting the large amount of information or the system is incapable of reacting quickly enough to status changes and status request commands. As a result, some systems will, for example, limit the number of lights in a group that it can properly control, or devise more sophisticated and thus more complicated and costly methods for controlling group of lights. For example, time slots can be reserved for certain controllers to allow them to control the group of lights at specific times without any interference from other controllers.

What is therefore needed is a system that can provide status information from devices in the system while avoiding the problems discussed above.

SUMMARY OF THE INVENTION

The present invention is a system and method for communicating status of devices between controllers of a peer to peer network of controllers where the system comprises at least one non-device specific controller and at least one device specific controller. The controllers have transmit and receive circuitry that allow them to route and receive messages. The controller further have processing circuitry for processing the messages to determine, for example, whether instructions from a received message is to be executed. Status information can be routed between the controllers of the system in accordance with a system protocol. One or more devices are connected or otherwise coupled to the at least one device specific controller. The status of a device can be changed based on commands received from the at least one non-device specific controller or based on actuation of an actuator of the device. As a result of the changed status of one or more of the devices coupled to the device specific controller, the controller updates its status information. The at least one device specific controller has stored therein a list of controllers and said at least one device specific controller is programmed to route status update messages to the controllers specified in the list in response to a status update request received from the at least one non-device specific controller.

In one embodiment of the system of the present invention, the status information routed by the at least one device specific controller is target status information.

The method of the present invention for a device specific controller comprises the step of the device specific controller receiving a request to update status information (i.e., status update request) of a coupled device where said request is routed by a non-device specific controller and said device specific controller contains a list of controllers that can receive its status update message. The method of the present invention for a device specific controller further comprises the step of routing, by the device specific controller, the status of the device to one or more of the controllers specified by the list in response to a status update request from the non-device specific controller.

The method of the present invention for a non-device specific controller comprises the step of the non-device specific controller routing a request to update the status of a device coupled to the at least one device specific controller. The method of the present invention for a non-device specific controller further comprises the step of receiving by said at least one non-device specific controller the status (i.e., status update information) of the device from the at least one device specific controller.

DETAILED DESCRIPTION

The present invention is a system and method for communicating status of devices between controllers of a peer to peer network of controllers. The system comprises at least one non-device specific controller (NDSC) and at least one device specific controller (DSC). The controllers have transmit and receive circuitry that allow them to route messages and receive messages. The controller further have processing circuitry for processing the messages to determine, for example, whether instructions from a received message is to be executed. Status information can be routed between the controllers of the system in accordance with a system protocol. The system protocol is a set of rules and procedures for the transmission of messages and the overall operation of the system with which the system complies. One or more devices are connected or otherwise coupled to the at least one DSC. The status of a device can be changed based on commands received from the at least one NDSC or based on actuation of an actuator of the device. As a result of the changed status of one or more of the devices coupled to the DSC, the device specific controller updates its status information. The at least one DSC has stored therein a list of controllers and said at least one DSC is programmed to route status update messages to the controllers specified on the list in response to an status update request received from the at least one NDSC. The terms "load" and "device" will hereinafter be used interchangeably and understood to have the same meaning.

A peer to peer network is a network comprising a plurality of nodes where each of said nodes is capable of transmitting and/or receiving information to/from one or more other node of the network. In the present invention, the messages are routed from one node to one or more other nodes based on a particular protocol and/or routing scheme. No one node in the network has greater transmission and/or reception priority over any other node. One example of a peer to peer network is a mesh network where messages are routed from one node to one or more other nodes and each node is capable of communicating with one or more other nodes by routing information to such other nodes. The peer to peer network of the system and method of the present invention may be implemented as an RF (Radio Frequency) network or a power line network. The RF and power line networks may be wireless networks. An RF peer to peer network uses controller that can transmit and receive RF signals and use said RF signals to route messages between nodes of the network. The signals are typically transmitted wirelessly. A power line peer to peer network uses controllers to route messages via electrical power lines; that is lines typically used to carry power (e.g., 120 volt, 60 Hz signals) to various connected loads. Both the RF network and the power line network may use wireless RF transmitters and receivers for at least a portion or all of the network.

Each of the controllers of the system of the present invention is a node of the peer to peer network. Each controller has transmission and reception circuitry and processing capabilities. The controllers can route messages based on instruction in the message and receive messages. Some controllers are referred to as device specific controllers (DSC) which are controllers that have additional circuitry allowing one or more loads to be electrically connected or coupled to said DSCs where said loads are directly or indirectly controlled by said DSCs. The loads or devices have actuators which when actuated can control such devices and thus change the status of such devices. The actuators may also be part of the DSC or may be connected or coupled to the DSC. Examples of loads include light fixtures, household appliances, household systems such as an HVAC system, or any electrical device or system to which electrical power can be delivered to allow the device or system to operate. The DSCs are able to obtain the status of the one or more coupled loads and store said information. The status of a load represents the state of the load at a particular time. Depending on the particular load, one or more parameters can be used to describe the state of that load. The state can be described by one or more parameters and the state can refer to one device or a group of devices. For example, parameters such as output power level, intensity, whether a device is in programming mode, whether a device is part of a scene, whether a device is in transition and whether a device is connected to another device or to a system, all describe different types of status of a device.

Each of the DSCs of the system of the present invention further has a stored list of specific controllers designated as being able to control the DSC and also being able to perform or execute instructions received from the DSCs. The list of controllers is referred to as an association list. An association list is stored in each DSC and comprises the addresses and/or identification of the particular controllers that can control the one or more devices connected to the DSC. Thus, a DSC is said to be associated with an NDSC when said NDSC is part of the association list. Each of the controllers specified in an association list can route messages (e.g., route commands such as an update request) to an associated DSC or other NDSCs or DSCs. A DSC mayor may not respond to a message from an NDSC and mayor may not perform tasks required by the message; a DSC will execute or perform tasks required by the message when said DSC is associated with the controllers that sent the message. Commands contained within the message are to be executed by the targeted DSC. That is, the controller for which the message was sent is the controller that performs the commands dictated by the message; that DSC executes the command by, for example, modifying the status of a coupled device. The DSCs have circuitry that can be programmed or configured to route information to other controllers (i.e., NDSCs and/or DSCs). A routed message contains not only the information being conveyed but instructions on how such information is to traverse the network. That is, the routed message contains routing instructions that indicate the specific nodes that the message may traverse to reach its final destination. Thus 'routing' is the transmission of information where such transmitted information includes instructions (i.e., routing instructions) on how the information is to traverse amongst the nodes of the peer to peer network of controllers.

An NDSC is a controller that is able to transmit command messages to DSCs and thus control the one or more devices connected or coupled to the DSC. Examples of an NDSC include a remote control, a zone controller, or a scene controller. NDSCs often have display equipment that can graphically or otherwise visually display the status of a particular device connected or coupled to a DSC. NDSCs of the present invention may use target status information to display the status of a device that it is controlling. Similar to the DSC, an NDSC contains transmit, receive and processing circuitry.

Each of the controllers may have routing instructions that dictate how messages received by the controller are to be routed by the controller. Each of the controllers may also have a routing list that contains the list of controllers to which they can route messages in accordance with a particular set of routing instructions. Typically, the DSCs receive commands (e.g., status update request) from NDSCs and NDSCs receive status update information from the DSCs. Some or all of the DSCs can be directly controlled by a user; that is, some or all of the DSCs have an actuator which can be manually actuated to control a connected device. When either an actuator for a device is actuated or an actuator of a DSC for controlling a device is actuated, the state of the device is modified and the DSC coupled to said device sends a HAIL message to one or more of its associated NDSCs indicating a possible change in the state of the device. It should be noted that the HAIL message does not contain any status information; it is simply an indication that an actuator for the device has been actuated. It should also be noted that when an actuator is actuated and the status of the device has not changed, a HAIL message is still transmitted by the DSC to indicate that the device is being or has been manually controlled.

Upon receiving a status update request from an associated NDSC, the DSC routes the status update information to one or more of its associated NDSCs. In one embodiment, the DSC routes the status update information to all of its associated NDSCs. In another embodiment, the NDSC that sent the status update request command is the last NDSC to receive the updated status information.

A primary controller is used to upload or store information into the controllers, (via a communication link), the routing lists (preferably during installation of the network), the association lists and messages that can be conveyed (transmitted and/or received) over the peer to peer network. All of the nodes (DSCs and NDSCs) of the system and method of the present invention can be reprogrammed at any time by the primary controller to redefine their ability to route status information to each other.

The particular route to be taken by the message is provided by the node from which the message originates. Any originating node is capable of accessing information about the topology of the network or obtain such information from other nodes of the network; such information is provided in the messages received from other nodes. The route is represented by the list of nodes between which the message should "hop" and the particular node sequence of the node hopping. Routing messages between two particular nodes may be done where the nodes can communicate directly or indirectly with each other.

In the present invention, a device can be controlled by more than one controller without incurring the bottleneck and bandwidth problems that the prior art networks experience when more than one controller attempts to control the same device and each of these controllers is to display the information it receives back from the device. One typical example of such a scenario occurs when lights connected to one dimmer/switch (a type of DSC) is controlled from several different locations by several different controllers and each of these controllers expects to receive information about the light intensity (i.e., status information) and correctly display this information. This is because the intensity can be adjusted from either one of the controllers or directly by a local actuator on the dimmer/switch. Such a task is necessary, for example, when a room has 2 entrances with wall controllers located at each entrance or when in addition to the wall controllers, the system has a PC controller or a handheld controller controlling the same devices. Controllers that are capable of controlling a group of devices such as a group of lights are referred to as zone or scene controllers. A scene is the lighting effect created when each light in a group of light is set at a particular intensity level.

To overcome the problems of bandwidth inefficiency and undue delay, the present invention may use 'target' status information to represent the status of a device or a group of devices. As previously discussed, true status information is information that represents the instantaneous state of a device. Thus, for example, when a light is fading from ON to OFF, the various voltage levels representing the changing light intensities are transmitted as a string of 'true status' information. Target status information is a final 'true status' value that a device will reach based on the commands it receives from a controller or based on the manual actuation of a user accessible actuator. In many instances, 'true status' information is a string of information that is changing over a period of time and the transmission of such information is not only bandwidth inefficient, but also causes delays to occur in the system. The final value of a string of 'true status' information is often the relevant information or the information that truly reflects the state of the device once the DSC has completed its execution of a command. Also, the target level is known as soon as the command is received or the actuation of a device is performed. For example, for a light, commands such as ON, OFF or SET LEVEL have a final value associated with them and thus an NDSC of the present invention will, upon routing the command, update its display to reflect the expected result of the command. Similarly, the DSC to which the command is routed will update its status information upon receipt of the routed command. In the example where the command is to switch the light from ON to OFF with the light fading to OFF, the light actuator will be actuated accordingly to cause a fade to OFF and this is known immediately by the DSC to which the light is coupled. The use of 'target status information' allows more efficient use of the system bandwidth because only the anticipated final value of the 'true status' information is transmitted and stored by the DSC instead of the transmission of a continuous string of 'true status' information. Thus, the use of 'target status information' allows the present invention to be used in systems having limited bandwidth. Further, for actuators having toggle action, the use of 'target status information' avoids delays in the reporting of status information to a controller.

In the present invention, DSCs route their 'target status information' to the associated controller requesting status information and to all other associated controllers. The requesting controller can obtain the status of all its associated nodes in the same manner in sequential fashion. In this manner, system traffic is properly regulated because updated status information is transmitted one node at a time significantly reducing the likelihood of collisions.

Using the target status information approach, a controller of the present invention may display the status of a device to which it is sending a command immediately upon transmitting the command. That is, the controller does not wait for a response to display the status of the device. The controller anticipates and displays the result of the command it is transmitting and does not wait to receive status information from the device confirming the results of the command. Thus the information displayed by the controller shows the status based on the command the controller itself transmitted not on the status information it is to receive from the device. In this manner, delays in the display of the status of the device are avoided. Therefore, the display of the controller not only shows information based on received status information, but also based on commands the controller itself has transmitted.

Another aspect of the present invention is how a DSC reacts to an incoming command from a controller or a command from a manual actuation while the DSC is transmitting status information due to a previous command or actuation. The present invention allows the DSC to finish transmitting its status information and then immediately transmit its latest updated status information (e.g., target status information) based on the command or actuation that occurred while it was transmitting the previous status information.

Figure 1:
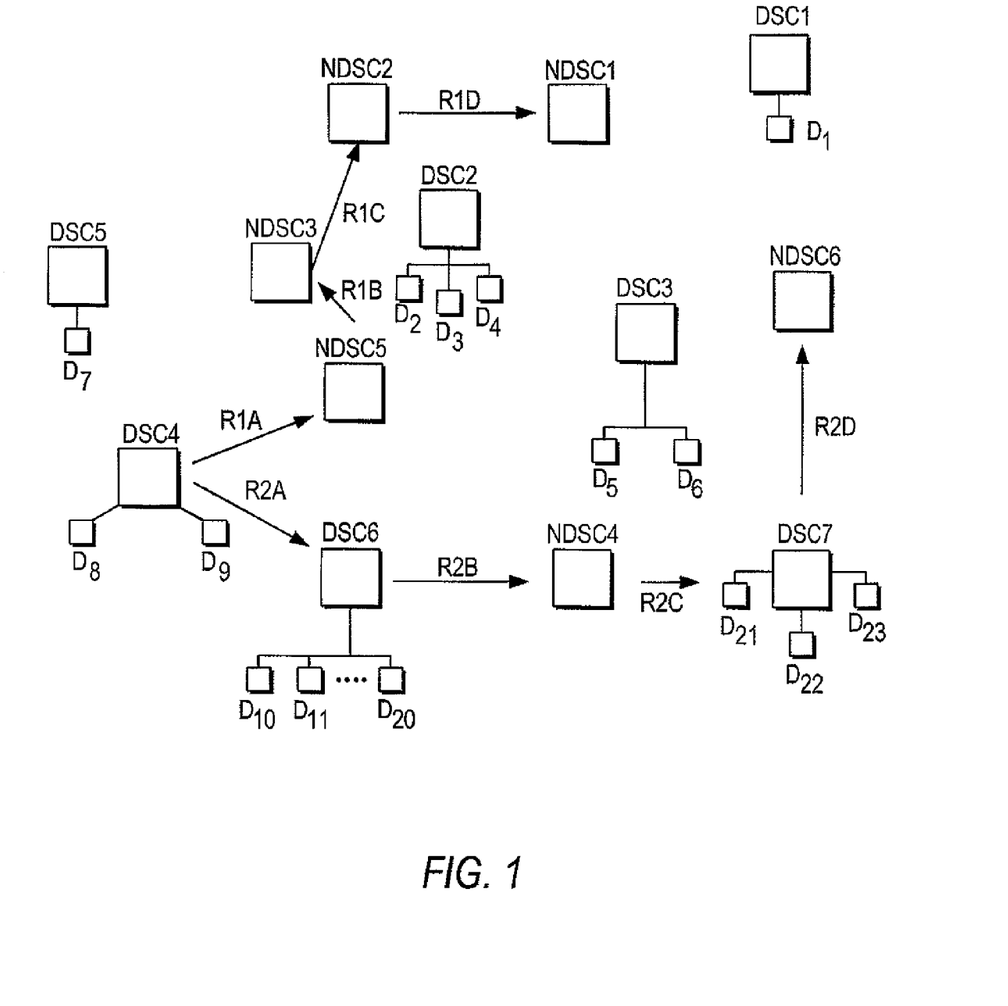
FIG. 1 is a block diagram of the system of the present invention using a peer to peer network of controller to route messages.

Referring now to FIG. 1, there is shown the system of the present invention. The network shown in FIG. 1 is configured in a particular manner that is not to be construed to be the only type of network of this invention. The network depicted in FIG. 1 can be a mesh network or any other peer to peer network in which messages can be routed between the nodes to control devices. The network comprises a plurality of communication nodes where each node is either a DSC or an NDSC. The NDSCs are as follows: NDSC1, NDSC2, NDSC3, NDSC4, NDSC5 and NDSC6. The DSCs are as follows: DSC1, DSC2, DSC3, DSC4, DSC5, DSC6 and DSC7. In the particular network shown, there are 13 nodes, 7 of which are DSCs and 6 of which are NDSCs. Various devices (D1-D23) are connected and/or coupled to the DSCs. The connection or coupling can be electrical, electromechanical, electro-optical or any other connection that allows the device to be controlled by the DSC. Although only 13 nodes are shown in FIG. 1, it will be understood that FIG. 1 is for illustrative purposes only and that the peer to peer network of the present invention comprises N nodes where N is any integer greater than 1. Further, the controller network depicted in FIG. 1 shows that the nodes communicate with each other over wireless communication links. The communication links in one preferred embodiment of this invention are wireless links through which messages—in the form of RF signals—are routed in accordance with a particular protocol. It will be understood, however, that the communication links can be any well known medium (wire, coaxial cable, optical fibers, waveguides) through which electrical or other type of propagating signals can be transmitted and received. The network of the present invention as shown is an interconnection of communication nodes where each node can transmit, receive, process and route information to any other node either directly or indirectly with the use of a routing scheme.

Routing of information between nodes may occur for nodes that can transmit information directly or indirectly to each other. Certain nodes may not be able to directly communicate with other nodes because of the relative positioning of these nodes. For example, node DSC4 may not be able to communicate with node NDSC1 and node NDSC6 directly because the RF signals from DSC4 to NDSC6 or NDSC1 may be blocked by one or more obstacles (not shown) positioned between them. Each node comprises at least transmission circuitry, receiving circuitry and a processor such as a microprocessor.

A particular example of the system and method of the present invention is shown in FIG. 1 where DSC4 is transmitting information (e.g., target status information) to NDSC1 and NDSC6 both of which are associated with DSC4, i.e., NDSC1 and NDSC6 are on DSC4's association list. FIG. 1 shows the route taken by one message to NDSC1 and the route taken by another message (or the same message) to NDSC6. For the message with NDSC1 as its destination, the message follows a route comprising paths R1A, R1B, R1C and R1D traversing or hopping from node DSC4 to NDSC5 to NDSC3 to NDSC2 and finally to NDSC1. Information transmitted by DSC4 will be tagged with the identification and/or addressed of the controllers on the DSC4's association list. It should be noted that for the route shown with NDSC1 as the destination node, none of the intervening nodes (i.e., NDSC5, NDSC3 and NDSC2) will execute the instructions contained in such message if such nodes are not on the association list of DSC4. Conversely, if one or more of these intervening nodes is part of the association list of DSC4, such nodes will not only route the message but also perform or execute the instructions carried by the message. For the message with NDSC6 as its destination, the message follows a route comprising paths R2A, R2B, R2C and R2D traversing or hopping from node DSC4 to DSC6 to NDSC4 to DSC7 and finally to NDSC6. It should be noted that for the route shown with NDSC6 as the destination node, none of the intervening nodes (i.e., DSC6, NDSC4 and DSC7) will execute the instructions contained in such message if such nodes are not part of the association list of DSC4. Conversely, if one or more of these intervening nodes is part of the association list of DSC4, such nodes will not only route the message but also perform or execute the instructions carried by the message.

Each DSC comprises at least transmission and reception circuitry, a processor and interface circuitry. Examples of DSCs include, but are not limited to dimmers, switches and other such mechanisms that control light fixtures, fans, occupancy sensors and the like directly connected to the DSC as shown in FIG. 1. The DSCs also have actuators (e.g., push button, rotary switch) which can be manually actuated so as to control the connected controlled devices. The processor and the interface circuitry portions of a DSC can be integrated into one circuit.

NDSCs also have association lists. Each of the NDSCs has an association list consisting of the addresses or identifications of one or more DSCs that can be controlled by the controller.

In addition to an association list, each controller has a routing list that designates how messages to various other controllers are to be routed. Depending on the topology of the network, messages transmitted by a first controller destined for a second controller may often not be able to reach the destination controller directly. Intermediate controllers receive the message from the first controller and, based on their routing list, route the message to a particular controller. The routing lists specify the particular order of the controllers that are to receive and transmit the message until it reaches its intended final controller. It will be understood that all messages have information about their original controller and their final controller so as to help any intermediate controller determine the particular routing list to be used. It will be also understood that each controller may have one or more routing lists. It will further be understood that each intermediate controller can tag the message with its identification or address to allow the next controller that receives the message to determine the routing history of the message. Also, controllers throughout the existence of the network may change positions relative to each other or additional controllers may be added. In such cases the routing lists of those controller and others may change to reflect the change in the topology of the network. In another embodiment of the present invention, each controller and each has a control list. The control list contains information on how to route messages and particular associations between DSCs and NDSCs. The control list, in effect, is a combination of the routing list, the association list for a DSC and the association list for an NDSC.

The messages (including commands) transmitted and/or received throughout the peer to peer network of the present invention are formatted as per a protocol. Further, the protocol defines how messages are transmitted, received and processed. The protocol may be a well known industry standard.

In addition to the DSCs, NDSCs and controlled devices, the system of the present invention has a primary controller (not shown) mainly used during the installation or construction of the network. The primary controller is used to upload various information to the controllers. As information is uploaded throughout the system the primary controller's position is changed to ensure that all of the controllers have been properly uploaded. At each position, the primary controller uploads information to various controllers and receives confirmation messages from the controllers notifying the primary controller that they have received the uploaded information. The information that is uploaded to the controllers comprise routing lists for the controllers, association lists for the DSCs, a list of defined messages (including commands) and the rules of the protocol being followed by the communication network; for another embodiment, the control list is uploaded instead of the routing and association lists. Also, each controller is assigned a unique identification or address that can also be uploaded from the primary controller during installation of the system of the present invention. The uploading of information from the primary controller to the DSCs and NDSCs (i.e., controllers) is typically done during the construction and/or installation of the system. The primary controller comprises processing circuitry (e.g., a microcontroller or microprocessor or digital signal processor), transceiver circuitry and interface circuitry (e.g., user actuators, display). The user manipulates the interface circuitry to upload the information typically stored in memory associated with the processing circuitry. The transceiver is used to transmit information to the different controllers and receive information from the different controllers.

Figure 2:
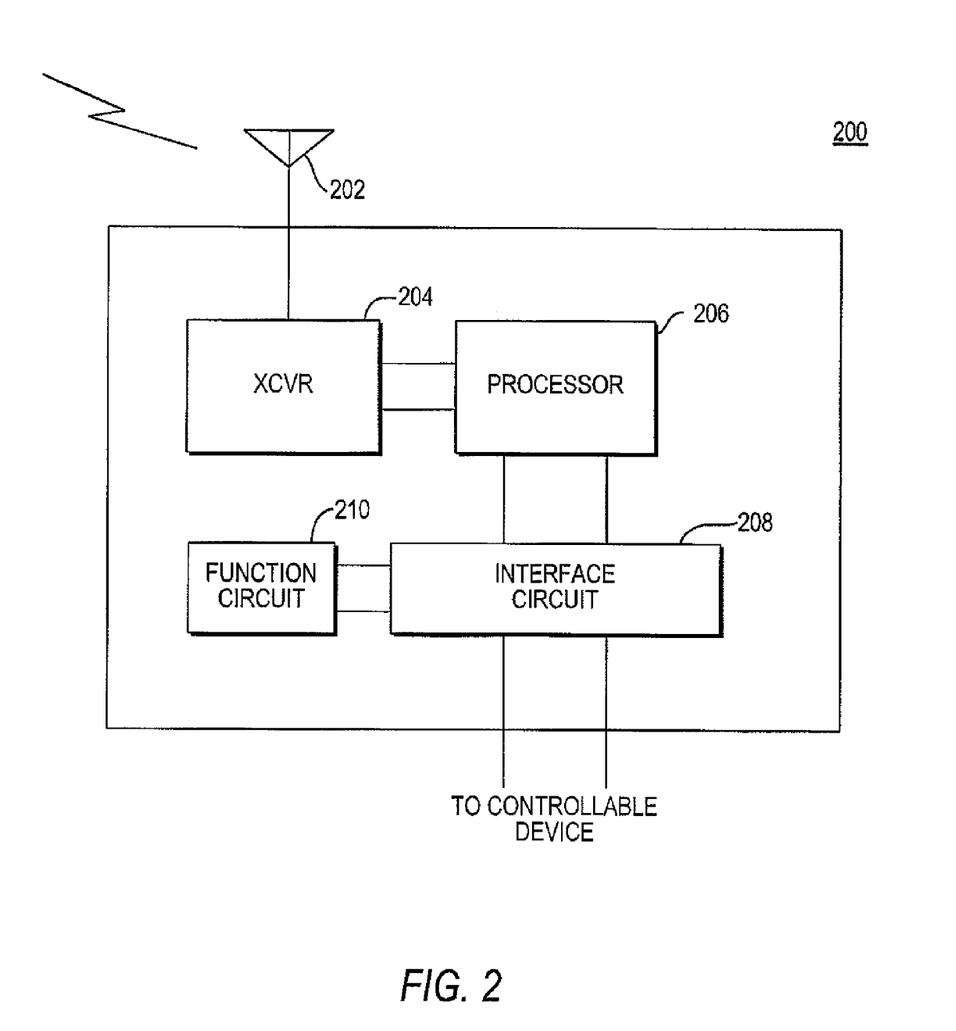
FIG. 2 is a block diagram of a DSC used in the system of the present invention.

Referring to FIG. 2, there is shown a block diagram of a DSC used in the system and method of the present invention. DSC 200 comprises an antenna 202 connected to transceiver 204 which is used to transmit and/or receive RF signals carrying information formatted as per the protocol being followed by system and method of the present invention. Wirelessly received information is transferred to processor 206 which processes the information to determine whether the information is from an associated controller and to determine the task(s), if any, to be performed. Processor 206 can be a microprocessor, a microcontroller or any circuitry that processes signals using hardware, firmware, software or any combination thereof. Processor 206 is designed to also generate and transmit wirelessly (or via media other than air) information through the use of transceiver 204 and antenna 202. Processor 206 in conjunction with function circuit 210 controls interface circuit 208 to control one or more devices (not shown). Interface circuit 208 not only operates to control devices but also interacts with one or more actuators (not shown) that allow a user to manually control the operation of a connected controllable device and perform the commands of the actuator by using function circuit 210. The interface circuit 208 directly interacts with the controllable device to control such a device based on signals generated by the function circuit and/or processor 206. The function circuit can be one of various types of circuits that are designed to perform one or more specific tasks for certain controllable devices. For example, DSC 200 can be a dimmer for a light fixture. In such a case, the function circuit would include circuitry that can control the amount of current provided to the light fixture to control the intensity of the light. Another example is DSC 200 being a switch that can be switched ON or OFF to either provide current or not provide current to an electrical load; in this example, the function circuit would include some type of electrically or electronically controllable switching mechanism. The function circuit can be controlled either by the processor or by an actuator (not shown) that can be activated by a user through interface circuit 208.

Figure 3:
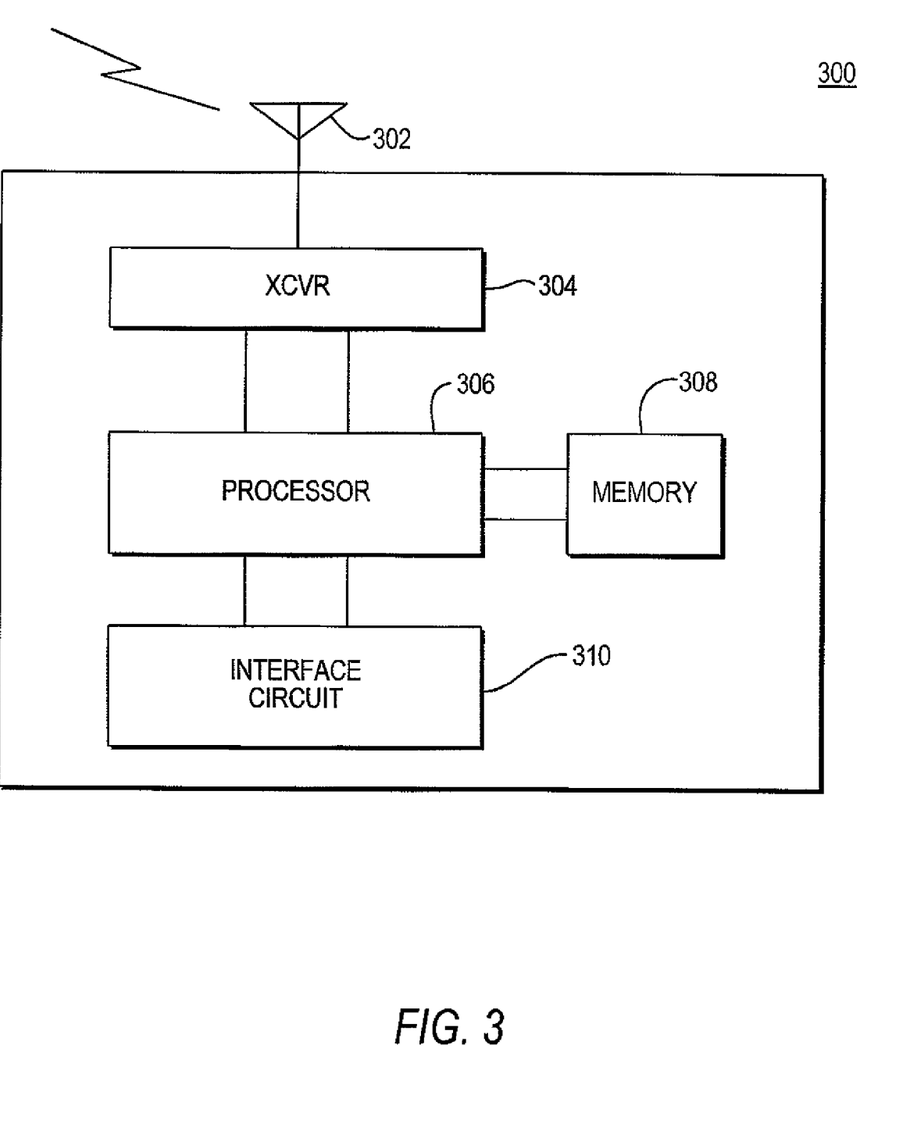
FIG. 3 is a block diagram of a NDSC used in the system of the present invention.

Referring to FIG. 3, there is shown a block diagram of an NDSC used in the system and method of the present invention. NDSC 300 comprises antenna 302 connected to transceiver 304 both of which are used to receive and/or transmit wirelessly RF signals or transmit other types of signals through media other than air. Processor 306 generates messages that are transmitted via transceiver 304 and antenna 302. Processor 306 also is designed to receive wirelessly information received through antenna 302 and transceiver 304. The received information is processed by processor 306 to determine its content or to determine if the received information is to be routed to another controller as per the routing list stored in memory circuit 308 of controller 300. Controller 300 also has an interface circuit 310 that interacts with actuators (not shown) that can be activated to control the operation of controller 300. Although not shown, controller 300 may also contain a display that interacts with and is in communication with interface circuit 310. The display is able to depict, in various formats, the status (e.g., received status information for one or more DSCs) and operation of controller 300. The primary controller (not shown) can have an architecture similar to the NDSC shown in FIG. 3. The primary controller may also have actuators and one or more displays that are used by a user to upload information to the DSCs and NDSCs.

The NDSC of FIG. 3 performs a method of controlling one or more devices with the use of one or more DSCs and a routing scheme that enables the routing of information to the DSC to which a device is connected or coupled. The connection between the device and the at least one DSC can be done with an electrical wire, an optical connection, a wireless connection, a connection via a waveguide or other well known connection that allows the propagation of controlling signals. Initially the method of the present invention provides at least one NDSC, and at least one DSC connected to a device. A primary controller is also provided and is positioned so as to be able to communicate with both the at least one NDSC and the at least one DSC. A communication link between the primary controller, the at least one DSC and the at least one NDSC is established. The establishment of the communication link is first done by the primary controller uploading to the at least one NDSC and the at least one DSC the rules of a communication protocol and the various messages and commands that are part of the protocol. The primary controller also uploads to the at least one NDSC and the at least one DSC, a routing list and an association list. In another embodiment of the method of the present invention, the routing list and association list can be combined to form a control list which is similarly uploaded to the at least one NDSC and the at least one DSC. Messages received by the at least one NDSC are processed by said controller to determine whether it is the intended recipient of the messages. If the messages are intended for the at least one NDSC, the message is retrieved and the information in the message is used by the NDSC for whatever designated purpose. For example, the received information may be information about the updated status of a device. If the at least one NDSC receives a message intended for another NDSC, the at least one NDSC will route that message as per its routing list. The at least one NDSC is able to route messages to at least one of the DSCs with which it is associated to control a device connected to the DSC.

During operation, the at least one DSC monitors the established communication links for incoming messages. The at least one DSC also monitors the state of the connected device to detect when the status of such a connected device has been changed in response to a manual actuation of one of the actuators of the DSC. When the at least one DSC receives a message, it determines whether such a message was transmitted from an associated NDSC. If the message is not from an associated NDSC, the message is ignored by the at least one DSC. When the message received by the DSC is determined to have been from an associated NDSC, the message is processed and any tasks dictated by the message are performed by the DSC. If the task performed deals with operating the controlled device so as to change its status, the DSC stores the updated status information. Upon a request (e.g., status request command) from an associated controller the updated status information is transmitted (as 'target status information', for example) by the DSC to the requesting associated NDSC or to one or more of the associated NDSCs. The DSC may have actuators which when actuated by a user of the system may or may not change the status of the connected controlled device. When it has been determined by the DSC that the actuator of a controlled device has been actuated, any updated status information is obtained and stored by the DSC. The DSC will not transmit the updated status information, but instead will transmit a HAIL message to one or more of the associated NDSCs. When the HAIL is received by one or more of the associated controllers, one of said controllers eventually transmits a status request message to the DSC allowing it to transmit the updated status information to the requesting NDSC or to one or more of the associated NDSCs. The DSC will not transmit the updated status information until it receives a status request from an associated controller.

What is claimed is:

1. A system for controlling devices and displaying status of said devices via a plurality of controllers, the system comprising:
   at least one device specific controller ("DSC") coupled to and configured to control at least one device;
   at least one non-device specific controller ("NDSC") that is in communication with at least one said DSCs and is configured to control at least one of said devices;
   an indication message transmitted by at least one or said DSCs, wherein said indication message is indicative of a change of stunts of at least one of said devices;
   an update request message transmitted by at least one of said NDSCs in response to receipt of said indication message; and
   a status update message transmitted by at least one of said DSCs in response to said update request message, wherein said status update message includes target status information, wherein said target status information is a final device status, and said target status is not a continuous device status.

2. The system of claim 1 further comprising at least one association list stored in each of said DSCs, wherein each of said association lists comprises identifying information of at least one of said controllers, and wherein at least one of said controllers is configured to control at least one of said devices.

3. The system of claim 2 wherein each of said DSCs is configured to transmit said status update message to each of said controllers that are on each of said association lists.

4. The system of claim 1 further comprising at least one association list stored in at least one of said NDSCs, wherein at least one of said association lists comprises identifying information of at least one of said DSCs, and wherein at least one of said DSCs is configured to be controlled by at least one of said NDSCs.

5. The system of claim 1 wherein at least one of said controllers further comprises at least one routing list comprising routing information for receiving and transmitting a message.

6. The system of claim 1 further comprising a primary controller, wherein said primary controller is configured to upload information to at least one of said controllers.

7. The system of claim 1 wherein:
at least one of said DSCs is configured to control the status of at least one of said devices; and
at least one of said NDSCs is configured to transmit a command to at least one of said DSCs to change the status of at least one of said devices.

8. The system of claim 1 wherein at least one of said DSCs further comprises an actuator.

9. The system of claim 1 wherein at least one of said devices further comprises an actuator.

10. The system of claim 1 wherein said plurality of controllers is configured to operate over a network selected from the group consisting of a wireless network and a power line network.

11. The system of claim 1 wherein at least one of said NDSCs is selected from the group consisting of a scene controller, a zone controller, and a remote control.

12. The system of claim 1 wherein at least one of said controllers is configured to display a status of at least one of said devices.

13. The system of claim 1 wherein at least one of said devices is selected from the group consisting of a light, an HVAC appliance, and an electrical appliance.

14. The system of claim 1 wherein at least one of said DSCs further comprises one or more from the group consisting of transmission circuitry, reception circuitry, a processor, and interface circuitry.

15. The system of claim 1 wherein at least one of said NDSCs further comprises one or more from the group consisting of a transceiver, a processor, a memory, and interface circuitry.

16. A method for controlling devices and displaying status of said devices via a plurality or controllers, the method comprising the steps of:
obtaining change of status information of at least one device by using at least one device specific controller ("DSC") that is coupled to at least one of said devices;
transmitting an indication message from at least one of said DSCs to at least one non device specific controller ("NDSC"), in response to said change of status information;
transmitting an update request message from at least one of said NDSCs to at least one of said DSCs, in response to said indication message; and
transmitting a status update message from at least one of said DSCs to at least one of said NDSCs, in response to said update request message, wherein said status update message includes target status information, wherein said target status information is a final device status, and said target status is not a continuous dice status.

17. The method of claim 16 further comprising the step of programming at least one association list on at least one first controller, wherein at least one of said association lists comprises a list of at least one second controller that can be controlled by at least one of said first controllers.

18. The method of claim 17 further comprising the step of transmitting said status update message from at least one of said DSCs to each of said controllers that are on at least one of said association lists on at least one of said DSCs.

19. The method of claim 16 further comprising the step of routing at least one of said messages sent by one of said plurality of transmitting steps from at least one first controller to at least one second controller.

20. The method of claim 19 further comprising the step of looking up routing information on a routing is gored in at least one of said controllers.

21. The method of claim 16 further comprising the step of uploading information to at least one controller by using a primary controller.

22. The method of claim 21 further comprising the step of establishing a communication link between said primary controller and at least one of said controllers.

23. The method of claim 16 wherein said transmitting steps comprises communicating over a network selected from the group consisting of a wireless network and a power line network.

24. The method of claim 16 further comprising the step of creating a scene by using at least one of said NDSCs and at least two devices, wherein at least two of said devices are coupled to at least one of said DSCs and are set at a preprogrammed level.

25. The method of claim 16 further comprising the step of transmitting said status update message to at least one of said NDSCs only after a pluralityy of other NDSCs receive said status update message.

26. The method, of claim 16 further comprising the step of displaying a status of at least one of said devices on at least one of said controllers.

27. A system for controlling at least one load comprising:
a first controller coupled to and configured to control said at least one load;
a second controller that is in communication with said first controller;
an indication message transmitted by said first controller, wherein said indication message is indicative of a change of status of said at least one load;
an update request message transmitted by said second controller in response to receipt of said indication message; and
a status update message transmitted by said first controller in response to said update request message, wherein said status update message includes target status information, wherein said target status information is a final device status, and said target status is not a continuous device status.

28. The system of claim 27 wherein the first controller is a dimmer and the second controller is a remote controller.

29. The system of claim 27 wherein the first controller further comprises an actuator for turning on or off the at least one load.

30. The system of claim 29 wherein the second controller further comprises an actuator for turning on or off the at least one load.

31. The system of claim 29 wherein said actuator is a manual actuator.

32. The system of claim 29 wherein said actuator is a user-accessible actuator.

* * * * *

UNITED STATES PATENT AND TRADEMARK OFFICE
CERTIFICATE OF CORRECTION

| | |
|---|---|
| PATENT NO. | : 8,386,661 B2 |
| APPLICATION NO. | : 11/559676 |
| DATED | : February 26, 2013 |
| INVENTOR(S) | : Michael Ostrovsky and Alfred J. Lombardi |

It is certified that error appears in the above-identified patent and that said Letters Patent is hereby corrected as shown below:

In the Claims:

Claim 1, Column 12, line 51, "or" should read "of"

Claim 1, Column 12, line 53, "stunts" should read "status"

Claim 16, Column 13, line 49, "or" should read "of"

Claim 16, Column 13, line 65, "dice" should read "device"

Claim 20, Column 14, line 14, "is gored" should read "list stored"

Claim 25, Column 14, line 31, "pluralityy" should read "plurality"

Signed and Sealed this
Ninth Day of September, 2014

Michelle K. Lee
*Deputy Director of the United States Patent and Trademark Office*